United States Patent

Shen et al.

[11] Patent Number: 5,878,962
[45] Date of Patent: Mar. 9, 1999

[54] PRESSURE SWIRL INJECTOR WITH ANGLED CONE SPRAY FOR FUEL INJECTION

[75] Inventors: Jingming Jim Shen, Newport News; Wei-Min Ren, Yorktown; David P. Wieczorek, Seaford; Gyula A. Huszar, Newport News, all of Va.

[73] Assignee: Siemens Automotive Corporation, Auburn Hills, Mich.

[21] Appl. No.: 936,247

[22] Filed: Sep. 24, 1997

[51] Int. Cl.[6] .......................... F02M 61/20; F02M 51/00; B05B 1/34
[52] U.S. Cl. .................... 239/533.9; 239/463; 239/533.2
[58] Field of Search .............................. 239/533.12, 533.3, 239/533.2, 533.1, 533.8, 533.9, 596, 494, 491, 463, 461, 602, 584, 583, 589, 591

[56] References Cited

U.S. PATENT DOCUMENTS 2,682,429  6/1954  Fortino ..................................... 239/591
2,968,441  1/1961  Holcomb .............................. 239/602 X
4,387,677  6/1983  Guerrier .
4,974,565  12/1990  Hashimoto et al. ........... 239/533.12 X
4,979,479  12/1990  Furukawa ........................ 239/533.12 X

OTHER PUBLICATIONS

Harada, et al.; Development of Direct Injection Gasoline Engine; SAE Publication 970540; 1997.

*Primary Examiner*—Andres Kashnikow
*Assistant Examiner*—Sean P. O'Hanlon

[57] ABSTRACT

A fuel injector has a swirl plate about a valve assembly, including a valve seat with an orifice and a valve pin. When the valve is opened, the fuel is swirled by the swirl plate for passage through the orifice. The orifice has a portion which is angled relative to the axis of the injector to provide a conical swirling spray pattern having a conical spray axis angularly related to the axis of the injector. In another form, the orifice is on-axis with the injector and receives a bent tube having an upstream on-axis portion and a downstream angled portion to direct the swirling conical spray at an included obtuse angle relative to the axis of the injector.

8 Claims, 3 Drawing Sheets

5,878,962

PRESSURE SWIRL INJECTOR WITH ANGLED CONE SPRAY FOR FUEL INJECTION

TECHNICAL FIELD

The present invention relates to injectors for injecting fuel into an internal combustion engine and particularly relates to a pressure swirl-type injector for ejecting fuel in a swirling conical spray pattern with an axis offset or angled relative to the axis of the fuel injector for flowing the swirling conical spray pattern in a desired direction.

BACKGROUND

Fuel injectors in general have long been used for injecting fuel into an internal combustion engine. Such fuel injectors typically include an elongated body having an armature carrying a valve and a needle or pin which, under the bias of a spring, normally closes an orifice through a seat at one end of the injector. By periodically pulsing a coil within the injector body, the valve is periodically opened and closed to supply fuel through the orifice to the engine cylinder. Typically, the spray pattern flowing from the injector is in a swirling conical shape. It is quantitatively dominated by an outer conical wall of spray, with substantially smaller quantities of the fuel from the injector flowing interiorly within the conically-shaped spray. The axis of the conical spray pattern is generally directed to an optimal part of the engine or fuel injection system and the injector is normally oriented so that the injector axis and the conical spray pattern axis are coincident with one another.

In certain engines, however, constraints imposed on the mounting of the injectors have indicated a need for directing the conical spray to the optimum part of the engine or fuel injection system, while simultaneously mounting the injector at a location and in a position wherein the axis of the injector does not coincide with the axis of the conical spray pattern. Consequently, a problem arises as to how to simultaneously direct a swirling conical spray pattern to the optimal part of the engine or fuel injection system while enabling the injector to be mounted at an angle offset from the axis of the conical spray pattern.

One effort to direct a conical spray pattern having a swirl associated with the pattern is disclosed in an article appearing in SAE Publication 970540, titled "Development of Direct Injection Gasoline Engine." The injector disclosed in that article, has what appears to be a spray pattern inclined at an angle from the axis of the injector, an upstream swirler and a downstream orifice apparently angled off the longitudinal axis of the injector. However, an intermediate chamber or pocket lies between the swirler and the angled orifice of that injector and which chamber is enlarged relative to the orifice. The pocket, however, diminishes the swirl pattern to such an extent that when the fuel leaves the injector such fuel is not significantly swirling. That is, the swirl pattern effected by the swirler upstream of the valve seat is substantially diminished as the fuel leaves the valve seat and enters and exits the pocket. Because of the many angled surfaces defining the pocket, it detrimentally diminishes the effect of the swirl pattern imparted upstream of the pocket by the swirler to the extent that the conical spray emitted from the injector has very little, if any, swirl effect.

DISCLOSURE OF THE INVENTION

According to the present invention, there is provided an injector having an orifice configured and arranged downstream of a swirler to effect a robust conical swirl pattern of the fuel ejected under pressure by the injector and at a conical spray angle angularly related to the axis of the injector such that the conical swirling spray pattern can be directed to the optimal part of the engine or fuel injection system notwithstanding the mounting of the injector at an orientation other than directed axially toward such optimal location. To accomplish this, the present invention provides an injector having an injector body with an end plate having an upstream frustoconical surface communicating upstream with a swirler to effect a swirl pattern in the fuel and an orifice downstream of the surface and which orifice has at least a flow passage portion angularly related to the axis of the injector.

In one principal form of the present invention, the orifice through the end plate can be angled relative to the axis of the injector to form an included obtuse angle. Thus, the swirl imparted to the fuel by the swirler flows smoothly about the frustoconical surface of the valve seat and effects a smooth transition to the orifice without flowing around sharp corners or into an enlarged volume or pocket. Consequently, the swirling pattern is maintained upon transitioning from the frustoconical surface into the angled opening and outwardly thereof to form the swirling conical spray pattern. It is believed that the smooth transitioning of the swirling fuel from the swirler to the outlet of the orifice without substantial flow turbulence, e.g., caused by sharp angles or turns, maintains the effectiveness of the swirler as the fuel is ejected from the injector in the conical swirl spray pattern.

In another form of the present invention, the orifice includes an opening downstream of the frustoconical surface and which opening lies on axis with the longitudinal axis of the injector. A tube is carried by the end plate and lies in communication with the opening. The tube can be directly angularly offset from the axis of the opening or, alternatively, the tube may have a first upstream portion coincident with the axis of the opening and a second downstream portion angled relative to the axis of the opening. Thus, the fuel passing through the opening in a swirling pattern continues that pattern as it passes through the tube and changes its angle relative to the longitudinal axis of the injector thereby producing an off-axis swirling conical spray pattern.

In a preferred embodiment according to the present invention, there is provided an injector for injecting fuel into an internal combustion engine, comprising an injector body having an orifice and a longitudinal axis, a valve carried by the body and movable between open and closed positions for periodically flowing fuel through the orifice into the engine, a swirler upstream of the orifice for swirling the fuel flowing through the orifice when the valve lies in an open position, at least a portion of the orifice being configured to flow the fuel downstream thereof in a conical swirl pattern having a flow axis angularly related to the longitudinal axis.

In a further preferred embodiment according to the present invention, there is provided an injector for injecting fuel into an internal combustion engine, comprising an injector body having an orifice and a longitudinal axis, a valve carried by the body and movable between open and closed positions for periodically flowing fuel through the orifice into the engine, a swirler upstream of the orifice for swirling the fuel flowing through the orifice when the valve lies in an open position, at least a portion of the orifice having an axis forming an included obtuse angle less than 180° with the longitudinal axis and an outlet for flowing fuel from the injector in a conical swirl pattern having an axis angularly related to the axis of the orifice portion.

Accordingly, it is a primary object of the present invention to provide a novel and improved fuel injector for directing a conical swirling spray pattern of fuel to an optimum location within the engine or fuel injection system and off-axis of the injector.

BEST MODE FOR CARRYING OUT THE INVENTION

Figure 1:
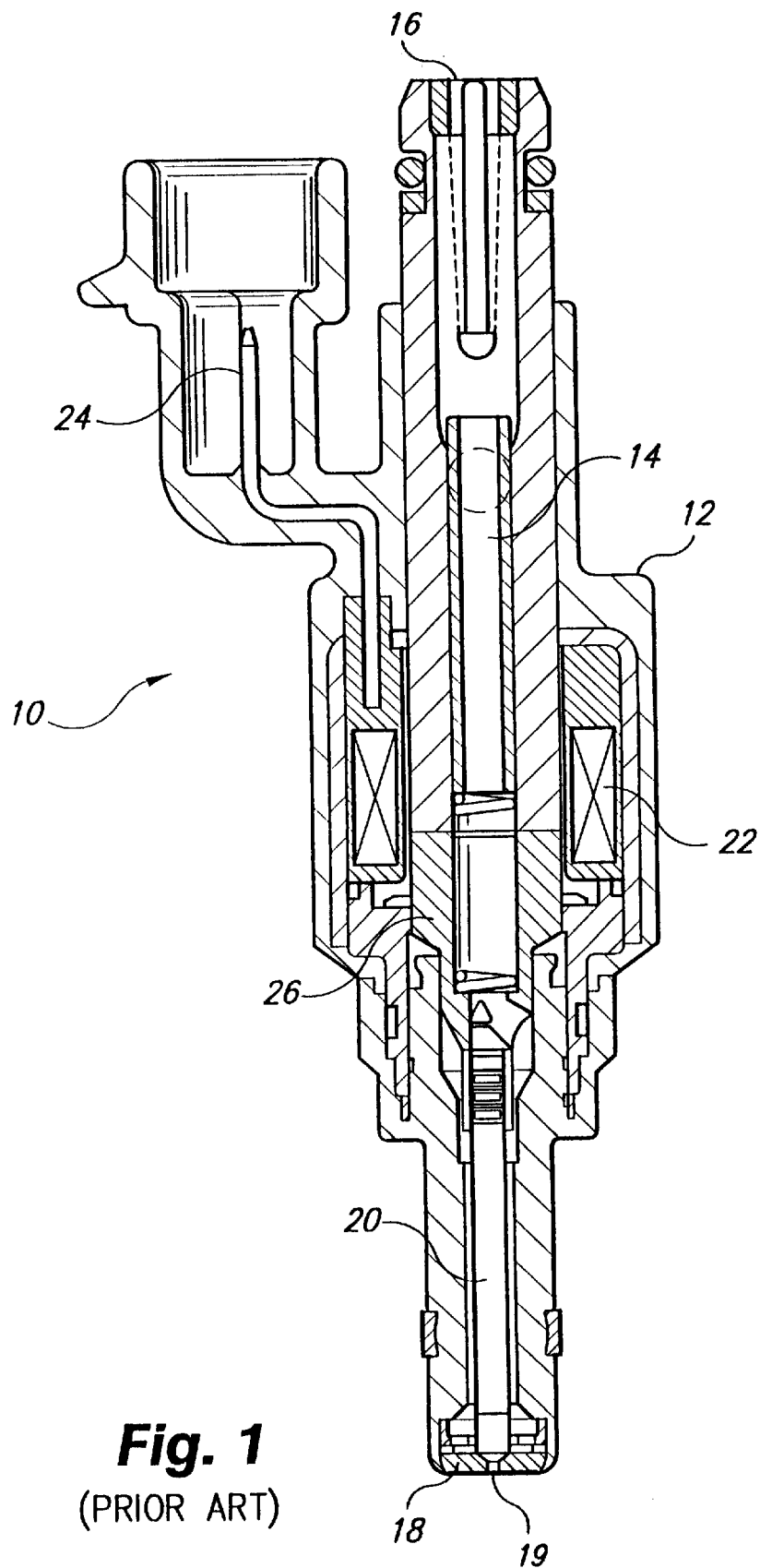
FIG. 1 is a longitudinal cross-sectional view of a conventional injector.
Figure 3:
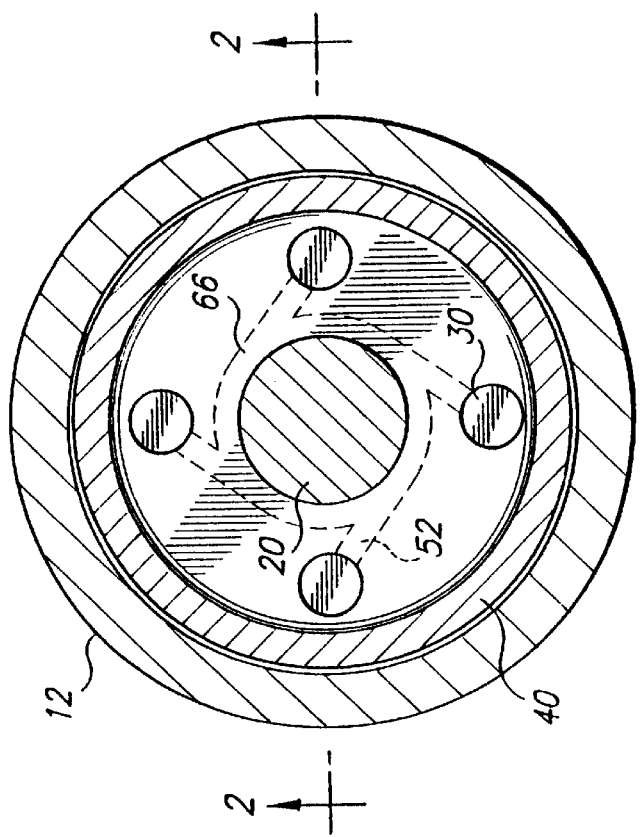
FIG. 3 is a cross-sectional view thereof taken generally about on line 3—3 in FIG. 2.

Referring now to the drawings, particularly to FIG. 1, there is illustrated a fuel injector for flowing fuel into an internal combustion engine. The fuel injector, generally designated 10, includes an injector body or valve 12, a central axial passageway 14 for receiving fuel under pressure from an inlet 16 at one end of the injector and a valve assembly at its opposite end including an end plate 18 and a valve pin or needle 20. Pin 20 is periodically displaced between open and closed positions with respect to the valve seat and an orifice 19 forming part of the end plate 18. The body 12 includes windings 22, an electrical connection 24 for the windings and an armature 26 coupled to the pin or needle 20 whereby, upon receiving pulsed electrical signals, the armature causes the pin or needle to periodically open and close the valve enabling fuel to periodically flow through orifice 19. The foregoing is conventional injector construction.

A preferred form of the present invention is illustrated in FIGS. 2–6 and includes at the lower end of the valve body 12 an end plate 30 secured to the body 12. End plate 30 includes an orifice 32 and a frustoconical valve surface or seat 34 upstream of orifice 32 forming a seat for the lower end of the valve pin or needle 20. The lower end of the body 12 includes a cavity 36 in which is disposed a disk 38 having an axially turned flange 40. Disk 38 has a plurality of holes or openings 42 extending between its opposite sides and arranged about a central axis of the disk 38. Disk 38 also includes a central opening 44 through which passes the tip of the pin or needle 20.

Figure 2:
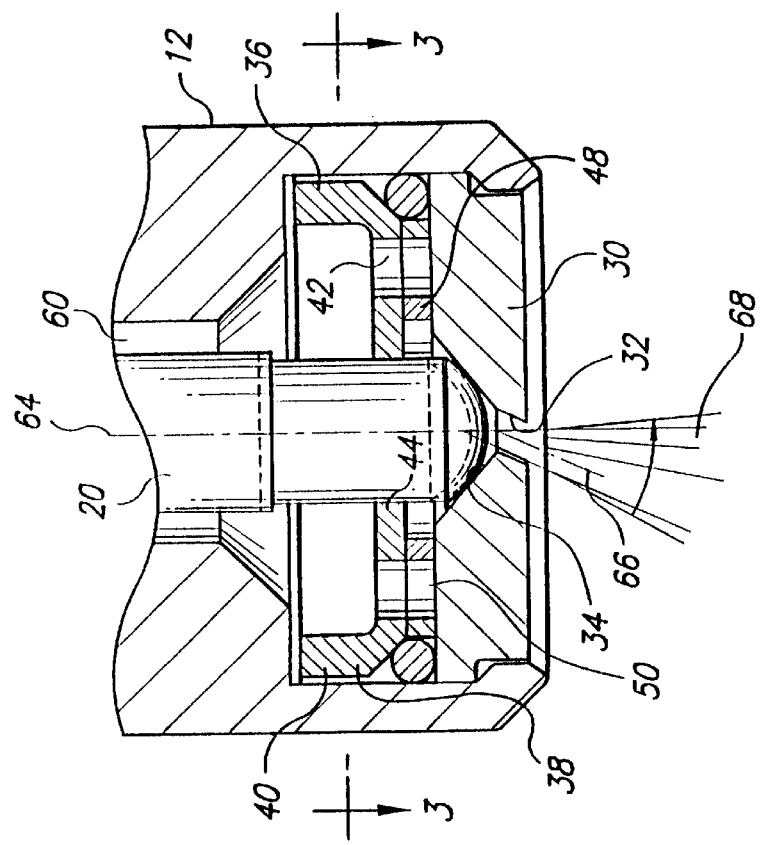
FIG. 2 is an enlarged cross-sectional view of the tip of an injector containing the swirler and orifice for forming a conical swirling spray pattern having an axis angularly related to the axis of the injector according to the present invention and taken about on line 2—2 of FIG. 3.

Between the disk 38 and the end plate 30, there is provided a swirler plate or disk 48. The swirler disk includes a plurality of openings 50 which, in assembly at the tip of the injector, lie in registry with the openings 42 through disk 38. Additionally, the swirler plate 48 includes passages 52 extending from each of the openings 50 in a tangential direction relative to pin 20 and defining discrete passageways for communicating fuel between the openings 50 and an annular chamber 56 about the pin or needle 20 when the latter is seated against seat 34. It will be appreciated that fuel flows under pressure about the pin 20 in an annular passage 60 toward the cavity 36. The fuel also flows through the registering openings 42 and 50 of the disk 38 and swirler plate 48, respectively, and into the passages 52 and the annular chamber 56 about pin or needle 20. When the pin or needle is in the closed position, as illustrated in FIG. 2, the fuel cannot pass from the injector through the orifice 32.

Upon opening the valve, i.e., spacing the pin or needle 20 from the seat 34, fuel passes under pressure through the passages 52 which impart a swirling motion to the fuel flow through the tip of the injector. The swirling fuel then passes between the needle or pin 20 and about the frustoconical valve seat 34 into the orifice 32. Typically, orifice 32 lies coincident with the longitudinal axis 64 of the injector. In accordance with the present invention, however, the orifice 32 has a flow passage therethrough having a central axis forming an included obtuse angle of less than 1 800 with the axis 64 of the injector. Thus, the axis 66 of the orifice 32 also forms the axis of a swirling conical spray pattern, generally designated 68, emerging from the orifice 32 the conical spray pattern, of course, occurring when the pin or needle 20 is spaced from surface 34, as illustrated by the dashed lines in FIG. 2. The conical spray pattern is characterized by a conical sheet of swirling fuel about the axis 66 with substantially only a minor quantity of fuel within the conical sheet of the conical spray pattern. The swirling effect is not significantly diminished by the structure set forth in FIGS. 2 and 3 because there are smooth transition areas between the swirler plate, which generates the swirling flow pattern, and the angled orifice 32. Thus, as illustrated in FIG. 2, there is a very shallow angle at the lip of the frustoconical surface 34 which serves to smoothly transition the generally radially swirling fuel into a generally shallow conical swirl pattern about seat 34. The swirling fuel then, under pressure, passes through the orifice 32, continuing the swirling pattern. While the angle on one side of the orifice 32 is large, i.e., the left side of orifice 32 in FIG. 2, the angle on the opposite side remains very shallow. Of course, angles about orifice 32 vary between the two large and shallow angles. However, it is believed that the large angle does not deleteriously affect the swirl pattern of the fuel flow because the average angle is shallow and affords a smooth flow transition which maintains the swirl flow.

Figure 4:
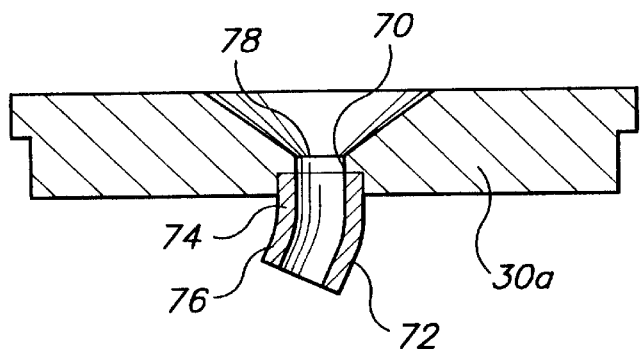
FIGS. 4, 5 and 6 disclose various forms of an injector constructed in accordance with the present invention having a bent tube for effecting the angled swirling conical spray pattern.

Referring now to FIG. 4, a particularly effective structure for affording an angular conical swirling spray pattern is illustrated. The orifice through the end plate includes an opening 70 and a tube 72 connected to the end plate 30a. For example, the opening 70 is on-axis with the longitudinal axis 64 of the injector. The tube 72 has a through flow passage having an upstream portion 74 with an axis generally coincident with the longitudinal axis of the injector. Tube 72 also includes a downstream portion 76 having an axis in its flow passage angularly related to the axis of the upstream portion and the axis of the injector. The tube 72 is essentially bent to form the angled conical swirling spray pattern. Importantly, the interior surfaces of the tube are rounded and form smooth transitions between on-axis and angularly related flows such that the swirling action of the fuel passing through the orifice is not substantially diminished as the angle of the flow changes. The orifice may be counterbored at 78 and the tube 72 welded to the end plate 30a in the counterbore. Counterboring the end plate facilitates a smooth transition at the interface between the end of the tube 72 and the walls of the orifice.

Figure 5:
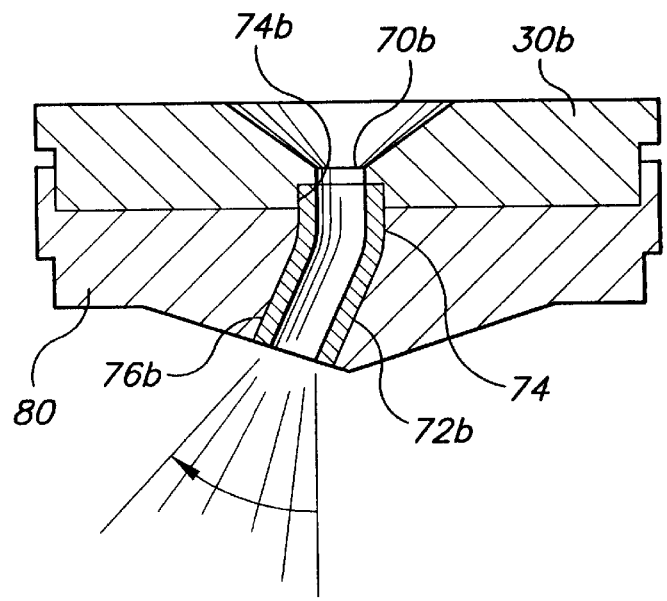

Referring to FIG. 5, wherein like reference numerals apply to like parts as in the prior embodiments, followed by the suffix "b," the end plate 30b similarly includes an opening 70b on-axis with the axis of the injector. Also, a tube 72b is secured to the end plate 30b in a counterbore 78b. The tube 72b has upstream and downstream portions 74b and 76b lying on-axis and angularly related, respectively, to the axis of the injector. A cap 80, preferably formed of powdered metal, may be formed on the end face of the end plate 30b about tube 72b. The end face of the cap 80 may be angled to correspond to the angle of the exit opening of the tube 72b. In this manner, the projecting tube is well protected by cap 80.

Figure 6:
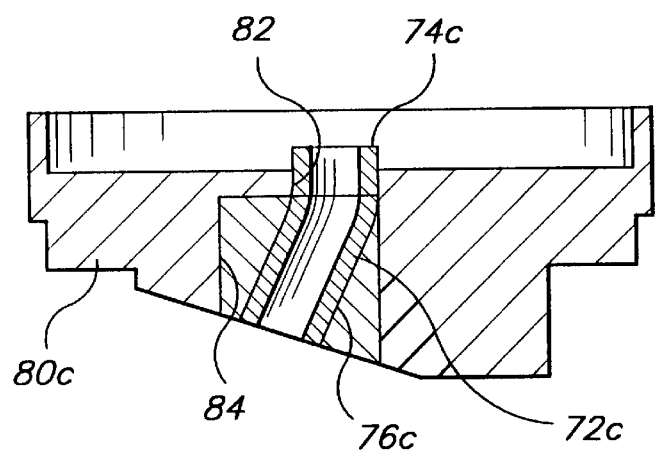

Referring now to FIG. 6, wherein like reference numerals apply to like parts as in the prior embodiments, followed by the suffix "c," the end plate, not shown in FIG. 6, may be formed similarly as in the prior embodiments of FIGS. 4 and 5. In this form, however, the cap 80c may have an on-axis opening 82 for receiving the upstream portion 74c of the tube 72c, together with an off-axis recess or counterbore 84 formed in the cap opening through its lower end. By inserting the bent tube 72c in the opening 82 and securing it to the end plate, not shown in this drawing figure, the lower downstream portion 76c of the tube extends wholly through the recess 84. The recess may be filled with weld material, for example, by silver welding, affording a protective cover for the tube 72c.

In all of these embodiments, it will be appreciated that the swirl pattern afforded by the swirl plate carries through the frustoconical seat when the valve is open, as well as through the orifice in all of its various forms including the bent tubes. This is a result of smooth transitions made between a tangentially flowing fuel which continues its swirl pattern as it advances axially and is then turned in an angular direction. The lack of sharp corners and protuberances avoids flow turbulence and the smooth transition surfaces afford a continuation of the strong swirl effected by the swirl plate as the fuel passes through the open valve.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An injector for injecting fuel into an internal combustion engine, comprising:

an injector body having an orifice and a longitudinal axis;

a valve carried by said body and movable between open and closed positions for periodically flowing fuel through said orifice into the engine;

a swirler upstream of said orifice for swirling the fuel flowing through said orifice when said valve lies in an open position;

at least a portion of said orifice being configured to flow the fuel downstream thereof in a conical swirl pattern having a flow axis angularly related to said longitudinal axis;

said injector including an end plate having an opening therethrough forming part of said orifice, said opening having an axis generally coincident with the longitudinal axis of said injector, a tube connected to said end plate and having a flow passage in communication with said opening, said flow passage having an axis angularly related to the longitudinal axis of said injector whereby the fuel flows outwardly of the tube in a conical swirl spray pattern having an axis generally coincident with the axis of the flow passage through said tube; and the opening through said end plate having a counterbore about an exterior face of said end plate, one end of said tube being received in said counterbore, and means for coupling said tube and said end plate to one another.

2. An injector according to claim 1 wherein said tube has an upstream portion thereof secured to said end plate and in said opening, said upstream portion having a flow passage therethrough with an axis generally coincident with the longitudinal axis of said injector, said tube having a portion downstream of said upstream portion and having a flow passage with an axis angularly related to said upstream flow passage axis for flowing fuel outwardly of said tube in a conical spray pattern having an axis generally coincident with the axis said downstream portion.

3. An injector according to claim 2 wherein said end plate has a recess downstream of said opening and within which recess said downstream portion of said tube passes, material disposed in said recess about said downstream tubular portion for securing the tube and end plate to one another.

4. An injector for injecting fuel into an internal combustion engine, comprising:

an injector body having an orifice and a longitudinal axis;

a valve carried by said body and movable between open and closed positions for periodically flowing fuel through said orifice into the engine;

a swirler upstream of said orifice for swirling the fuel flowing through said orifice when said valve lies in an open position;

at least a portion of said orifice being configured to flow the fuel downstream thereof in a conical swirl pattern having a flow axis angularly related to said longitudinal axis;

said injector including an end plate having an opening therethrough forming part of said orifice, said opening having an axis generally coincident with the longitudinal axis of said injector, a tube connected to said end plate and having a flow passage in communication with said opening, said flow passage having an axis angularly related to the longitudinal axis of said injector whereby the fuel flows outwardly of the tube in a conical swirl spray pattern having an axis generally coincident with the axis of the flow passage through said tube; and said tube having a first portion having a flow axis generally coincident with the axis of said opening and a second portion having said angular flow axis further angularly related to the flow axis of said first portion.

5. An injector for injecting fuel into an internal combustion engine, comprising:

an injector body having an orifice and a longitudinal axis;

a valve carried by said body and movable between open and closed positions for periodically flowing fuel through said orifice into the engine;

a swirler upstream of said orifice for swirling the fuel flowing through said orifice when said valve lies in an open position, at least a portion of said orifice having an axis forming an included obtuse angle less than 180° with said longitudinal axis and an outlet for flowing fuel from said injector in a conical swirl pattern having an axis angularly related to the axis of said orifice portion; and said injector including an end plate having an opening therethrough forming part of said orifice, said opening having an axis generally coincident with the longitudinal axis of said injector, a tube connected to said end plate and having a flow passage in communication with said opening, said flow passage having an axis angularly related to the longitudinal axis of said injector whereby the fuel flows outwardly of the tube in a conical swirl spray pattern having an axis generally coincident with the axis of the flow passage through said tube.

6. An injector according to claim 5 wherein the opening through said end plate has a counterbore about an exterior face of said end plate, one end of said tube being received in said counterbore, and means for coupling said tube and said end plate to one another.

7. An injector according to claim 5 wherein said tube has a first portion having a flow axis generally coincident with the axis of said opening and a second portion having said angular flow axis further angularly related to the flow axis of said first portion.

8. An injector according to claim 5 wherein said tube has an upstream portion thereof secured to said end plate and in said opening, said upstream portion having a flow passage therethrough with an axis generally coincident with the longitudinal axis of said injector, said tube having a portion downstream of said upstream portion and defining said flow passage with an axis angularly related to said upstream flow passage axis for flowing fuel outwardly of said tube in a conical spray pattern having an axis generally coincident with the axis said downstream portion.

* * * * *